(12) United States Patent
Schlachter et al.

(10) Patent No.: US 9,760,558 B2
(45) Date of Patent: *Sep. 12, 2017

(54) EXTRACTING DATA FROM DOCUMENTS USING PROXIMITY OF LABELS AND DATA AND FONT ATTRIBUTES

(71) Applicant: INTERNATIONAL BUSINESS MACHINES CORPORATION, Armonk, NY (US)

(72) Inventors: Michael J. Schlachter, Tarrytown, NY (US); Elvir Sinanovic, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,793

(22) Filed: Oct. 4, 2016

(65) Prior Publication Data

US 2017/0228590 A1    Aug. 10, 2017

Related U.S. Application Data

(63) Continuation-in-part of application No. 15/016,982, filed on Feb. 5, 2016, now Pat. No. 9,508,043.

(51) Int. Cl.
*G06F 17/30* (2006.01)
*G06F 17/27* (2006.01)

(52) U.S. Cl.
CPC .... *G06F 17/2705* (2013.01); *G06F 17/30616* (2013.01)

(58) Field of Classification Search
CPC ................ G06F 17/30616; G06F 17/2705
See application file for complete search history.

(56) References Cited

U.S. PATENT DOCUMENTS

2013/0223743 A1    8/2013   Deryagin et al.

FOREIGN PATENT DOCUMENTS

WO         2007070010 A1      6/2007

*Primary Examiner* — Jason Liao
(74) *Attorney, Agent, or Firm* — Shimokaji IP

(57) ABSTRACT

A method for identifying information in a document may include analyzing the document for a text block containing a structure element, wherein said structure element is a position, font attribute, or text character; applying a rule based analysis on the text block to identify an adjacent label and field containing a value; and identifying said label and said value as a label and value pair in the document.

1 Claim, 1 Drawing Sheet

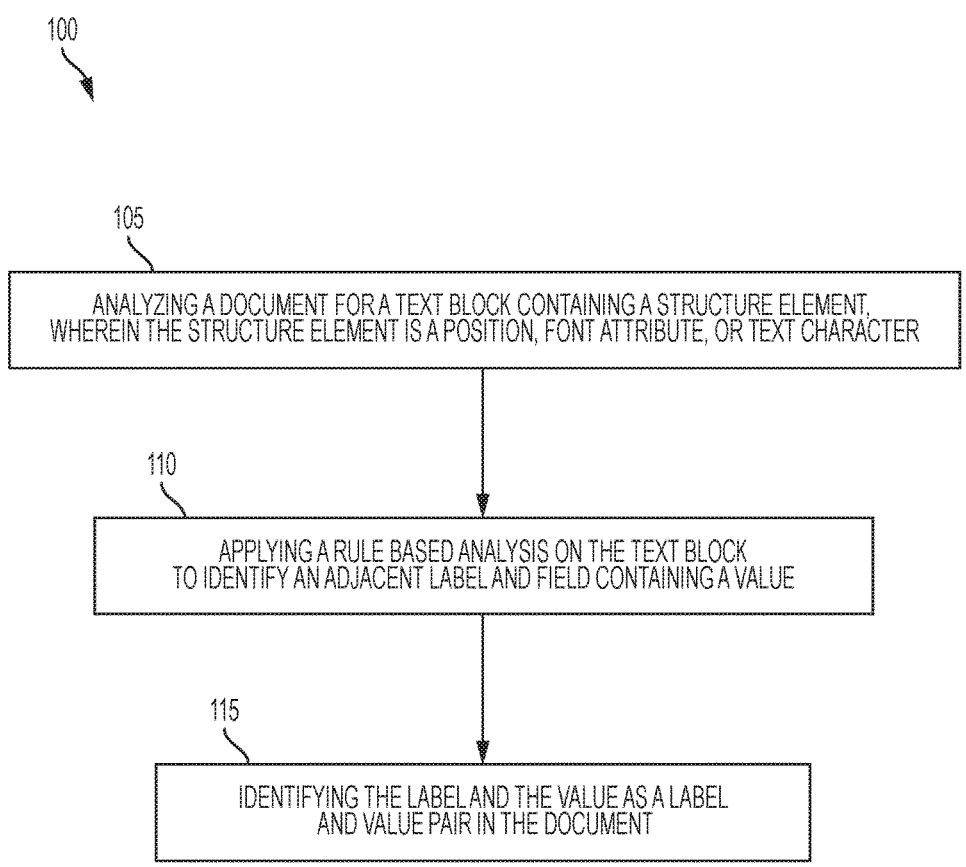

EXTRACTING DATA FROM DOCUMENTS USING PROXIMITY OF LABELS AND DATA AND FONT ATTRIBUTES

This application is a continuation in part of parent application Ser. No. 15/016,982, and claims priority benefit to that application.

BACKGROUND OF THE INVENTION

The present invention generally relates to extracting data. More particularly, the present invention relates to extracting data from documents using proximity of labels and data and font attributes.

Extraction of data from documents can require significant effort. This extraction of data may be required to process electronic documents successfully.

As can be seen, there is a need for a method of extracting data from documents using proximity of labels and data and font attributes.

SUMMARY OF THE INVENTION

In one aspect, a computer program product for identifying information in a document, the computer program product comprising a computer readable storage medium having program instructions embodied therewith, the program instructions executable by a computer to cause the computer to: scan a document using optical character recognition; analyze the scanned document for a text block within the scanned document, wherein the text block contains a structure element, wherein said structure element is a position, font attribute, or text character, and wherein a plurality of label and value pairs within the scanned document are identified based on the contents of the text block within the structure element; apply a rule based analysis on the text block to identify a label and a field containing a value, wherein data in a text block identified as a header, footer, title, heading, or paragraph is not included in any label and value pair; wherein in response to a first word in the text block being bold and a second word in the text block being non-bold, then the first word in the text block is the label and the second word in the text block is the value; wherein in response to the first word in the text block being non-bold and the second word in the text block being bold, then the first word in the text block is the label and the second word in the text block is the value; wherein in response to the first word in the text block containing only lower case characters and the second word in the text block containing only upper case characters, then the first word in the text block is the label and the second word in the text block is the value; wherein in response to the first word in the text block being followed by a separator character, and there being a second word after the separator character, then the first word in the text block is the label and the second word in the text block is the value; wherein in response to a first line in the text block containing a first word in bold followed by a separator character, and a second line in the text block containing a second word in non-bold, then the first line in the text block is the label and the second line in the text block is the value; and identify said label and said value as a label and value pair in the document.

These and other features, aspects and advantages of the present invention will become better understood with reference to the following drawings, description and claims.

BRIEF DESCRIPTION OF THE DRAWINGS

FIG. 1 illustrates a method of identifying information in a document.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a method for extracting data from documents using proximity of labels and data and font attributes.

In FIG. 1 a method 100 for identifying information in a document may include a step 105 of analyzing a document for a text block containing a structure element wherein the structure element is a position, font attribute, or text character. A step 110 may include applying a rule based analysis on the text block to identify an adjacent label and field containing a value. A step 115 may include identifying the label and the value as a label and value pair in the document.

In an embodiment, the method 100 may use position, font attributes, and text characters of a structure element within a document to identify label and value pairs within the document. This analysis can be performed on scanned documents where optical character recognition was performed, or on electronic documents and spreadsheets.

In an embodiment, the method 100 may provide automatic identification of label and value pairs. The basis for identifying a pair may be to evaluate text contained in the pair, or evaluate blocks of text adjacent to the pair. A block may be a grouping of text that a person would consider logically grouped together through visual inspection of a document. Blocks can contain other blocks. For example a table may be a block containing rows which contain cells that are considered blocks. A block can contain a block that is a line of text. A line of text can contain blocks that are words and spaces. A word may contain blocks that are characters. Another example of a block can be a heading followed by a paragraph. Groups of text that are close together above or below or side by side with space between them and other text is a block. This invention may not describe identifying blocks of text and may assume the text is already correctly grouped into blocks.

In an embodiment, the method 100 may include the requirement that a label may contain no more than 4 words. Separator characters such as a colon may be removed from the end of labels. Data in a block identified as a Header, Footer, Title, Heading, or Paragraph may not be considered a pair.

In an embodiment, the method 100 may include the requirement that if the first word of the block is bold, then identify the first non-bold word in the same line. If a non-bold word is found make sure no further non-bold characters are present in the block. The bold portion of the block may be considered the label and the non-bold portion may be considered the value.

Example:
First Name John

In an embodiment, the method 100 may include the requirement that the first word of the block contains only upper case characters, then identify the first word in the same line that is contains lower case characters. The words that contain only upper case characters may be considered the label and the words that contain lower case characters may be considered the value.

Example:
FIRST NAME John

In an embodiment, the method 100 may include the requirement that if the first word of the block is not bold look for the first bold word in the same line. If a bold word is found make sure no further bold characters are present in the block. The non-bold portion of the block may be considered the label and the bold portion may be considered the value.

Example:
First Name John

In an embodiment, the method 100 may include the requirement that the first word of the block contains lower case characters, then identify the first word in the same line that is contains lower case characters. The words that contain lower case characters may be considered the label and the words that contain only upper case characters may be considered the value.

Example:
First Name JOHN

In an embodiment, the method 100 may include a requirement that when a block contains a word ending with a separator character such as a colon the words preceding the separator may be considered the label and the following words may be the value.

Example:
First Name: John
In this example the pair label is "First Name" and the value is "John".

In an embodiment, the method 100 may include the requirement that when a table has two columns, a first column may contain labels and a second column may contain values when the first column has only bold characters and the second does not.

Example:

| First Name | John  |
|------------|-------|
| Last Name  | Smith |

In this example there are two pairs. The label of the first pair is "First Name" and the value is "John". The label of the second pair is "Last Name" and the value is "Smith".

In an embodiment, the method 100 may include the requirement that when a table has two columns, a first column may contain labels and a second column may contain values when the first column contains only non-bold characters and the second contains only bold characters Example:

| First Name | John  |
|------------|-------|
| Last Name  | Smith |

In this example there are two pairs. The label of the first pair is "First Name" and the value is "John". The label of the second pair is "Last Name" and the value is "Smith".

In an embodiment, the method 100 may include the requirement that when a table has two columns, a first column may contain labels and a second column may contain values when the first column cell value ends with a separator character.

Example:

| First Name: | John  |
|-------------|-------|
| Last Name:  | Smith |

In this example there are two pairs. The label of the first pair is "First Name" and the value is "John". The label of the second pair is "Last Name" and the value is "Smith".

In an embodiment, the method 100 may include the requirement that when a table has two columns, a first column may contain labels and a second column may contain values when either the first or second cell has all capital letters or the other does not.

Example:

| FIRST NAME | John  |
|------------|-------|
| Last Name: | SMITH |

In this example there are two pairs. The label of the first pair is "First Name" and the value is "John". The label of the second pair is "Last Name" and the value is "Smith".

In an embodiment, the method 100 may include a feature that when a table has two or more columns the first column may contain the labels and the second column may contain values on two or more rows. If the first column has bold text and/or ends with a separator character such as a colon, the text in each row of the second column may be combined into one value.

Example:

| Name: | John |
|-------|------|
|       | Doe  |

In this example the label will be "Name" and the value will be "John Doe".

In an embodiment, the method 100 may include a feature that if the first line is bold and/or ends with a separator character such as a colon and there is one following line the first line may be considered a label and the second a value.
Example:
First Name:
John The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for identifying information in a document, the computer program product comprising a computer readable storage medium having program instructions embodied therewith, the program instructions executable by a computer to cause the computer to:
scan a document using optical character recognition;
analyze the scanned document for a text block within the scanned document, wherein the text block contains a structure element, wherein said structure element is a position, font attribute, or text character, and wherein a plurality of label and value pairs within the scanned document are identified based on the contents of the text block within the structure element;

apply a rule based analysis on the text block to identify a label and a field containing a value, wherein data in a text block identified as a header, footer, title, heading, or paragraph is not included in any label and value pair;

wherein in response to a first word in the text block being bold and a second word in the text block being non-bold, then the first word in the text block is the label and the second word in the text block is the value;

wherein in response to the first word in the text block being non-bold and the second word in the text block being bold, then the first word in the text block is the label and the second word in the text block is the value;

wherein in response to the first word in the text block containing only lower case characters and the second word in the text block containing only upper case characters, then the first word in the text block is the label and the second word in the text block is the value;

wherein in response to the first word in the text block being followed by a separator character, and there being a second word after the separator character, then the first word in the text block is the label and the second word in the text block is the value;

wherein in response to a first line in the text block containing a first word in bold followed by a separator character, and a second line in the text block containing a second word in non-bold, then the first line in the text block is the label and the second line in the text block is the value; and identify said label and said value as a label and value pair in the document.

* * * * *